United States Patent
Barnett et al.

(10) Patent No.: US 10,064,341 B2
(45) Date of Patent: Sep. 4, 2018

(54) HEDGETRIMMER WITH BENDABLE BLADE

(71) Applicant: BLACK & DECKER INC., Newark, DE (US)

(72) Inventors: Corey Barnett, Bowie, MD (US); Oleksiy Sergyeyenko, Baldwin, MD (US); Marco A. Mattucci, Fallston, MD (US)

(73) Assignee: BLACK & DECKER INC., New Britain, CT (US)

( * ) Notice: Subject to any disclaimer, the term of this patent is extended or adjusted under 35 U.S.C. 154(b) by 100 days.

(21) Appl. No.: 14/806,794

(22) Filed: Jul. 23, 2015

(65) Prior Publication Data

US 2017/0020080 A1 Jan. 26, 2017

(51) Int. Cl.
*A01G 3/053* (2006.01)
*A01G 3/04* (2006.01)

(52) U.S. Cl.
CPC ............... *A01G 3/053* (2013.01); *A01G 3/04* (2013.01)

(58) Field of Classification Search
CPC ........ A01G 3/053; A01G 3/0535; A01G 3/04; A01G 3/047; A01G 2003/0461; A01G 3/06; A01G 3/085
USPC .................... 56/233; 30/199, 223
See application file for complete search history.

(56) References Cited

U.S. PATENT DOCUMENTS

| | | | |
|---|---|---|---|
| 498,713 A | 5/1893 | Chase et al. | |
| 1,115,328 A | 10/1914 | Murran | |
| 2,174,130 A | 6/1937 | Looper | |
| 2,513,663 A | 10/1946 | McDaniel | |
| 3,913,304 A | 10/1975 | Jodoin | |
| 4,651,420 A * | 3/1987 | Lonnecker | A01G 3/053 30/210 |
| 4,970,791 A | 11/1990 | Vergara | |
| 5,111,583 A | 5/1992 | Martinez Alcala | |
| 7,603,781 B1 | 10/2009 | Szoke, Jr. | |
| 7,707,727 B1 | 5/2010 | Szoke | |
| 8,042,275 B2 | 10/2011 | Sergyeyenko | |
| 2013/0160304 A1 | 6/2013 | Tate | |

FOREIGN PATENT DOCUMENTS

| | | | |
|---|---|---|---|
| DE | 2752234 A1 * | 6/1979 | ............. A01G 3/053 |
| DE | 202009014274 | 12/2010 | |
| FR | 1375893 A * | 10/1964 | ............. A01G 3/053 |
| JP | 2005261275 | 9/2005 | |
| WO | WO2011047854 A2 * | 4/2011 | |

OTHER PUBLICATIONS

EP search report dated Jan. 13, 2017 for EP Application No. 16180910.8.

* cited by examiner

*Primary Examiner* — Jennifer Swinney

(74) *Attorney, Agent, or Firm* — John Yun

(57) ABSTRACT

A hedgetrimmer having a blade assembly that converts between a straight blade configuration and a curved blade configuration. The blade assembly includes a support bar for securing a pair of cutting blades. The support bar is made up of a plurality of rotatable support links allowing the support bar to curve. A switch assembly includes a rigid wire fixedly secured to the support bar. The rigid wire extends and retracts, moving the support bar between its straight and curved configuration.

16 Claims, 4 Drawing Sheets

US 10,064,341 B2

HEDGETRIMMER WITH BENDABLE BLADE

FIELD OF THE INVENTION

The present invention relates to vegetation cutting devices, specifically hedgetrimmers having a bendable blade assembly.

BACKGROUND OF THE INVENTION

Vegetation cutting devices such as hedge trimmers are known power operated tools for cutting hedges and other foliage and vegetation. Typically hedge trimmers are powered by a gas engine or electric motor that drives a blade assembly comprising a pair of reciprocating blades. The reciprocating blades are attached to a support bar that extends straight out from a housing containing the engine or motor. These straight blade assemblies are adequate when cutting in straight lines, for example, the tops and sides of box-shaped vegetation, but they are lacking when cutting rounded or curved edges. This is especially true when cutting at or near the bottom portions of hedges, bushes or other vegetation.

BRIEF SUMMARY OF THE INVENTION

According to an aspect of the invention, a hedgetrimmer is provided having a housing containing a motor, a blade assembly extending out from the housing, the blade assembly having a support bar and a pair of blades for cutting vegetation, the motor operatively connected to at least one of the blades to move it in a reciprocal motion. The support bar can include a plurality of support links and a switch assembly capable of moving the blade assembly between a curved configuration and a straight configuration.

In a further embodiment of the invention, the switch assembly is fixedly secured proximate to the housing, and the switch assembly includes a rigid member having a first end extending out from the switch assembly and a second end fixedly secured to a distal end of the blade assembly. The switch assembly includes a lever rotatably secured to a trunnion, the lever being movable between a first position in which the rigid member is in a retracted position in which the blade assembly is in the straight configuration, and a second position in which the rigid member is in a extended position and the blade assembly is in the curved configuration.

A further embodiment includes a support collar positioned between the first end and the second end of the rigid member, the support collar providing a bearing for the rigid member to help maintain its alignment.

A further embodiment of the invention discloses that the support bar can comprise a plurality of support links that are rotatably connected to one another in alternating fashion. Also, the first and second support links can be generally U-shaped.

BRIEF DESCRIPTION OF THE INVENTION

Further features and advantages of the present invention will be better understood by reference to the following description, which is given by way of example and in association with the accompanying drawings, in which.

Figure 1:
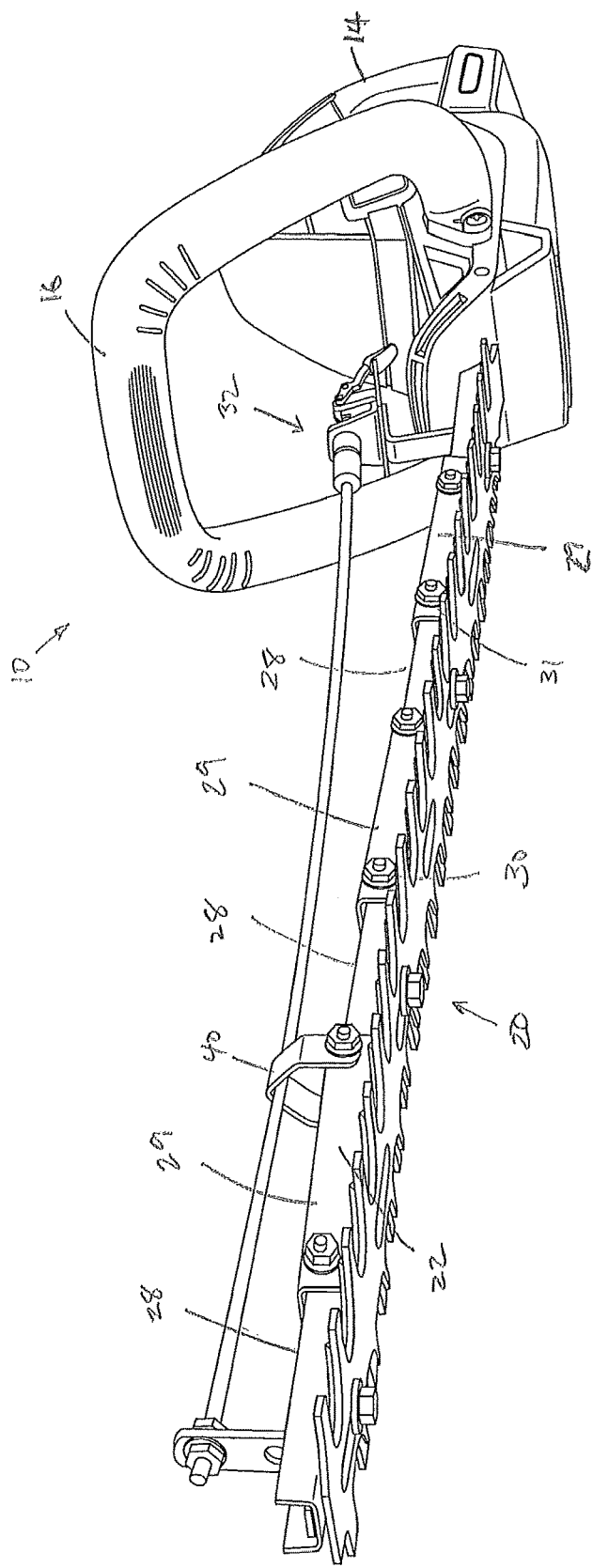
FIG. 1 is a front perspective view of a hedgetrimmer according to an embodiment of the invention.
Figure 4:
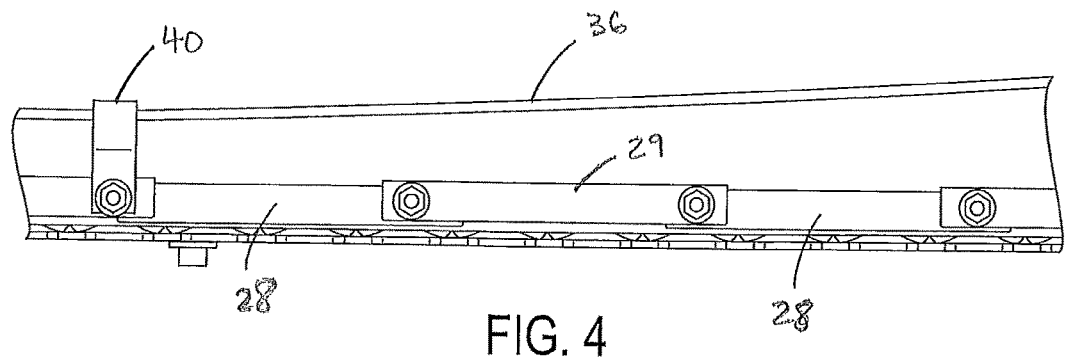

FIG. 4 side detailed view of the blade assembly of FIG. 1; and

Figure 5:
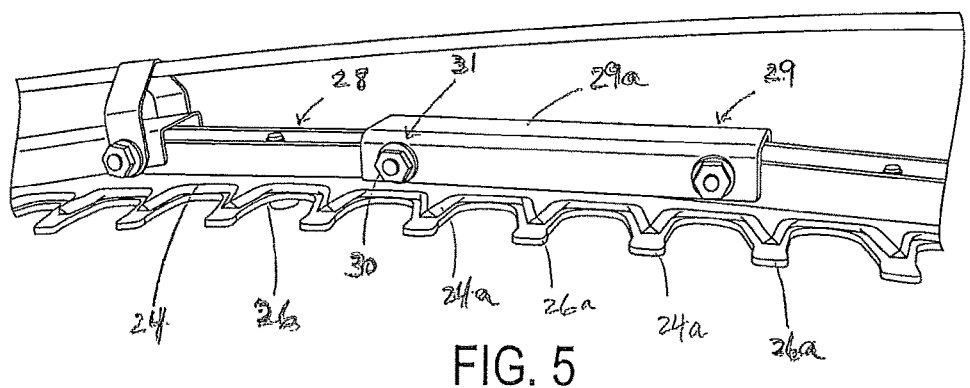

FIG. 5 is a top perspective view of the blade assembly of FIG. 1;

DETAILED DESCRIPTION OF THE INVENTION

Figure 2:
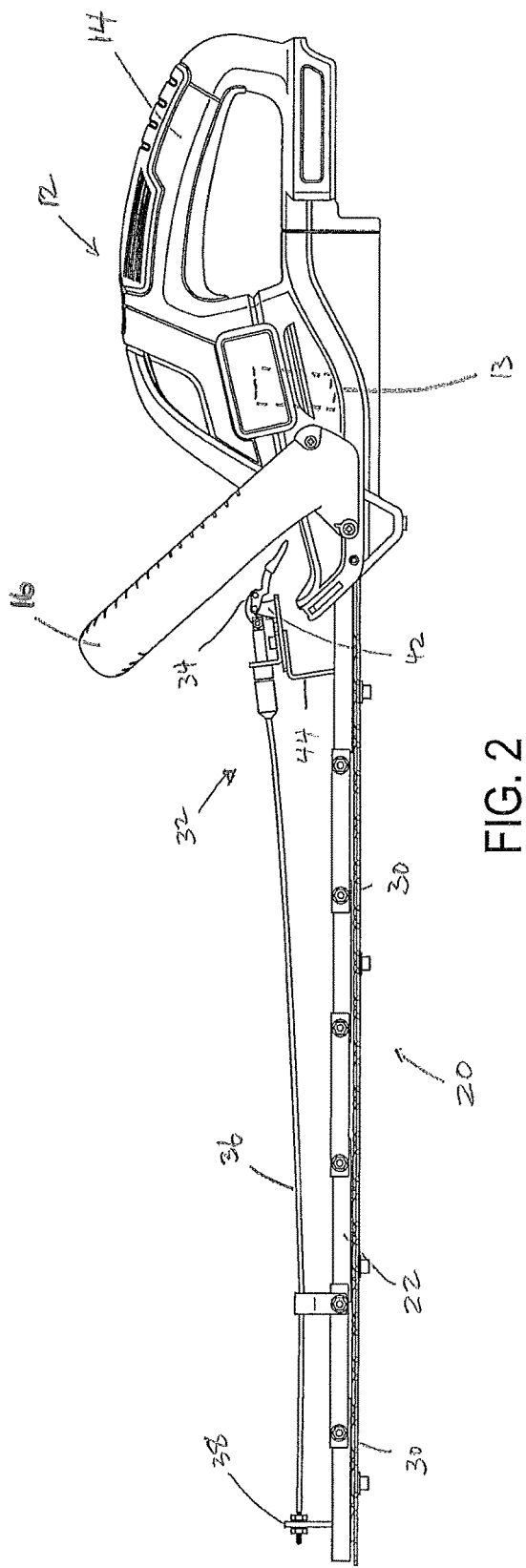
FIG. 2 is a side view of FIG. 1 with the blade assembly in a straight configuration.

FIGS. 1 and 2 show a hedgetrimmer 10 according to an embodiment of the present invention. The hedgetrimmer 10 has a housing 12 containing an electric motor 13. The housing includes a rear handle 14 and a front auxiliary handle 16. A user is required to place his hands on both handles to securely and safely operate the tool. In a preferred embodiment, the motor is an electric motor powered by a rechargeable battery. Alternatively, the electric motor can be powered by mainline electricity provided through an electrical cord, or could be an engine powered by gasoline or other combustible fuel.

Figure 3:
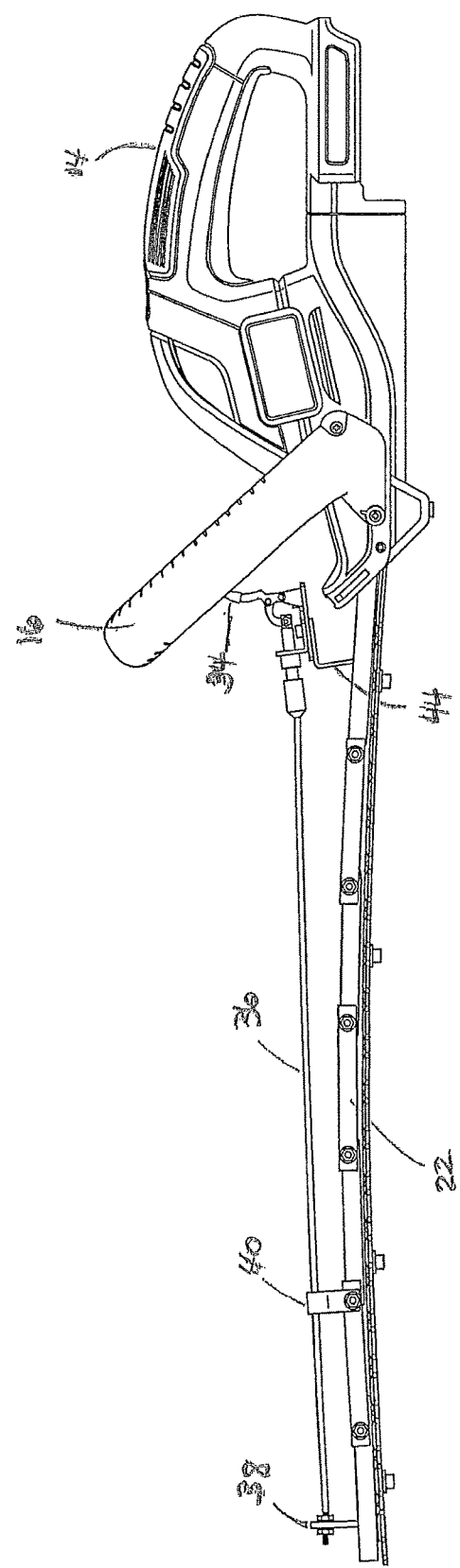
FIG. 3 is a side view of FIG. 1 with the blade assembly in a curved configuration.

A blade assembly 20 extends out from the front of the housing 12. FIG. 2 shows the blade assembly 20 in a straight configuration and FIG. 3 shows the blade assembly 20 in a curved configuration. The blade assembly 20 includes a support bar 22 with two reciprocating cutting blades 24 and 26 (FIG. 5) that are driven by the motor 13. The blades 24, 26 are typical hedgetrimmer blades, each formed from a unitary piece of metal having a plurality of teeth 24a, 26a that interact with corresponding teeth on the other blade. When the blades 24, 26 reciprocally move back and forth, any vegetation or debris that enters the gap between the teeth 24a, 26a of the blades are cut.

As best shown in FIG. 1 and FIG. 5, the support bar 22 of the blade assembly is made up of a series of first and second support links 28 and 29, respectively, that are pivotally connected to one another by screws 30 at linkage connections 31. The figures show four first support links 28 and three second support links 29 alternately connected to one another.

Both sets of support links 28 and 29 are U-shaped, except that the second support links 29 are assembled upside-down. Additionally, the first support links 28 are smaller than the second support links 29 so that they fit inside the second support links 29. In this way, the support bar 22 can curve only in a single direction, for example as shown in FIGS. 3 and 5, curved downwardly or in a convex configuration. The top cross beam 29a of the second support link 29 prevents the support bar 22 from curving in the opposite upwardly direction (eg. concave configuration). The amount of curvature can be adjusted by varying the overlap of the support links 28 and 29, with greater overlap reducing the amount of curvature. It should be apparent that although the support bar is described as having a series of U-shaped support links, the support bar can be made of a unitary structure and/or the support links can take alternate shapes. The support bar can take various forms so long as it is capable of bending into a curved configuration.

Additionally, although the invention has been described where both blades 24, 26 move in a reciprocating motion, some hedgetrimmers have only a single reciprocating blade, with the other blade being fixed, and the invention described herein could be incorporated into those hedgetrimmers as well. Furthermore, in these designs, the fixed blade could act as the support bar 22, eliminating the need for the support bar, and act as the support for the reciprocating blade. Otherwise, it would be identical to the preferred embodiment disclosed herein.

Positioned on the support bar 22 is a switch assembly 32 that converts the hedgetrimmer from its straight configuration shown in FIG. 2 to its curved configuration shown in FIG. 3. The switch assembly 32 is fixed to the support bar 22 proximal to the housing 12. It should be noted that the switch assembly 32 does not need to be fixed to the support bar 22, but could be fixed to the housing 12, front handle 16, or any other structure near the proximal end of the blade assembly, preferably close to a user's hands.

Referring to FIG. 2, the switch assembly 32 includes a lever 34 secured to a trunnion 42 so that it can rotatably move between a down (straight blade configuration) position and an up (curved blade configuration) position. The trunnion 42 is fixedly secured to a bracket 44 which is secured to the support bar 22.

The lever 34 is connected to a structurally rigid member 36 at its proximal first end, with the rigid member 36 being secured to the support bar 22 at a distal second end by an anchor bracket 38. The rigid member 36 can take various forms, and in the present embodiment is a rigid wire made of metal. A support collar 40 is positioned between the two ends to help stabilize and maintain the position of the wire 36. As best shown in FIG. 1, the support collar 40 is generally V-shaped at its apex to hold the wire 36 in position.

The transition of the hedgetrimmer from its straight configuration to its curved configuration will now be described. FIG. 2, shows the hedgetrimmer 10 with the blade assembly 20 in the straight configuration, with the lever 34 in the down position. To convert the hedgetrimmer blade assembly 20 to the curved configuration, the lever 34 is pivoted upward to its upright position, as shown in FIG. 3. The lever 34 moves the rigid wire 36 linearly forward. Since the distal end of the wire form 36 is secured to the anchor bracket 38 and cannot move forward, it pushes a forward section of the blade assembly 20 downward. The support links 28, 29 then rotate relative to one another at the linkage connections 31 to produce the curved shape.

The support collar 40 helps to prevent the wire form from buckling and so aids in the consistent and smooth transition between the two configurations. Furthermore, all the first support links 28 are identical to one another, as are all the second support links 29. When assembled, they are spaced consistently along the length of the support bar to promote a smooth curvature of the blade assembly.

Additionally, although standard hedgetrimmer blades are used, thinner blades could be incorporated so that the blades curve more easily and/or greater total blade curvature can be achieved. Also, the blade can be formed so that their starting or default position is either the straight configuration or curved configuration. In either case, the switch assembly 32 would move the blade assembly 20 into the other, stressed position for operation.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure

The invention claimed is:

1. A vegetation cutting device, comprising:
a housing containing a motor;
a rear handle and a front auxiliary handle;
a blade assembly extending out from the housing, the blade assembly having a support bar and a first and a second longitudinal blade for cutting vegetation, the first and second longitudinal blades each extending parallel to a majority of a length of the support bar, the motor operatively connected to at least one blade to move it in a reciprocal motion, the support bar comprising a plurality of first and second support links rotatably connected to one another and nested within each other; and
a switch assembly capable of moving the blade assembly between a curved configuration and a straight configuration.

2. The vegetation cutting device of claim 1, wherein the switch assembly is fixedly secured proximate to the housing, and the switch assembly includes a rigid member having a first end extending out from the switch assembly and a second end fixedly secured to a distal end of the blade assembly.

3. The vegetation cutting device of claim 2, further comprising a support collar positioned between the first end and the second end of the rigid member, the support collar providing a bearing for the rigid member to maintain its alignment with respect to the support bar.

4. The vegetation cutting device of claim 2, wherein the switch assembly includes a lever rotatably secured on a bracket, the lever being movable between a first position in which the rigid member is in a retracted position and the blade assembly is in the straight configuration, and a second position in which the rigid member is in an extended position and the blade assembly is in the curved configuration.

5. The vegetation cutting device of claim 1, wherein the first and second support links are U-shaped.

6. The vegetation cutting device of claim 1, wherein the blade assembly curves in a single direction.

7. A hedgetrimmer comprising:
a support bar extending out from a hedgetrimmer motor housing, the support bar being made up of a plurality of interconnected support links;
a first and a second longitudinal blade secured to the support bar with each blade extending parallel to a majority of a length of the support bar, wherein at least one of the blades is capable of moving linearly with respect to the support bar;
a switch assembly operatively connected to the support bar and positioned adjacent an auxiliary handle at a proximal end of the support bar, the switch assembly including a lever connected to a rigid member that is spaced from the support bar so as not to be in continuous contact with the support bar, the rigid member extending generally parallel over the support bar and secured to the support bar at a distal end and being capable of bending the support bar and the first and second blades between a straight blade configuration and a curved blade configuration.

8. The hedgetrimmer of claim 7, wherein the support links include a plurality of first support links and a plurality of second support links, wherein the first and second support links are arranged to nested in an adjacent support link.

9. The hedgetrimmer of claim 8, wherein the first and second support links are U-shaped.

10. The hedgetrimmer of claim 7, wherein the lever is a pivotable lever, the lever being movable between a first position where the rigid member is in a first position corresponding to the straight blade configuration, and a second position where the rigid member is in a second position corresponding to the curved blade configuration.

11. A method of operation for a hedgetrimmer with a curvable blade configuration, comprising the steps of:
provinding a hedgetrimmer having a housing and a blade assembly extending forward from the housing, the blade assembly having a support bar, a first blade and a second blade secured to the support bar and each extending a majority of a length of the support bar, wherein at least one of the blades is capable of moving linearly with respect to the support bar, and a switch assembly operatively connected to the support bar, the switch assembly having a lever connected to a rigid member, the rigid member spaced from the support bar so as not to be in continuous contact with the support bar, the rigid member extending generally parallel over the support bar and secured to the support bar at a distal end;
moving the lever from a first position corresponding to a straight blade configuration to a second position corresponding to a curved blade configuration;
wherein movement of the lever, pushes the rigid member forward;
wherein the rigid member pushes a distal end of the support bar in a direction perpendicular to the length, so that the blade assembly is in its curved blade configuration.

12. The method of operation for a hedgetrimmer of claim 11, wherein the support bar includes a plurality of support links connected to one another; and wherein the support links rotate with respect to each other.

13. The method of operation for a hedgetrimmer of claim 12, further comprising a support collar positioned between a first end and a second end of the rigid member, the support collar providing a bearing for the rigid member to help maintain its alignment.

14. The method of operation for a hedgetrimmer of claim 13, wherein the support links are U-shaped.

15. A vegetation cutting device, comprising:
a housing containing a motor;
a rear handle and a front auxiliary handle;
a blade assembly extending out from the housing, the blade assembly having a support bar and a first and a second longitudinal blade for cutting vegetation, the first and second longitudinal blades each extending parallel to a majority of a length of the support bar, the motor operatively connected to at least one blade to move it in a reciprocal motion, the support bar comprising a plurality of first and second support links rotatably connected to one another, and nested with each other; and
a switch assembly capable of moving the blade assembly between a curved configuration and a straight configuration.

16. The vegetation cutting device of claim 15 wherein the first and second support links have at least one flat planar wall.

* * * * *